Oct. 12, 1926.

E. I. DIENER 1,602,605

COMPUTING CHART

Filed Sept. 27, 1923   2 Sheets-Sheet 1

Witnesses:

Inventor
Eugene I. Diener

Oct. 12, 1926.
E. I. DIENER
COMPUTING CHART
Filed Sept. 27, 1923      2 Sheets-Sheet 2
1,602,605
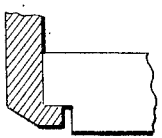
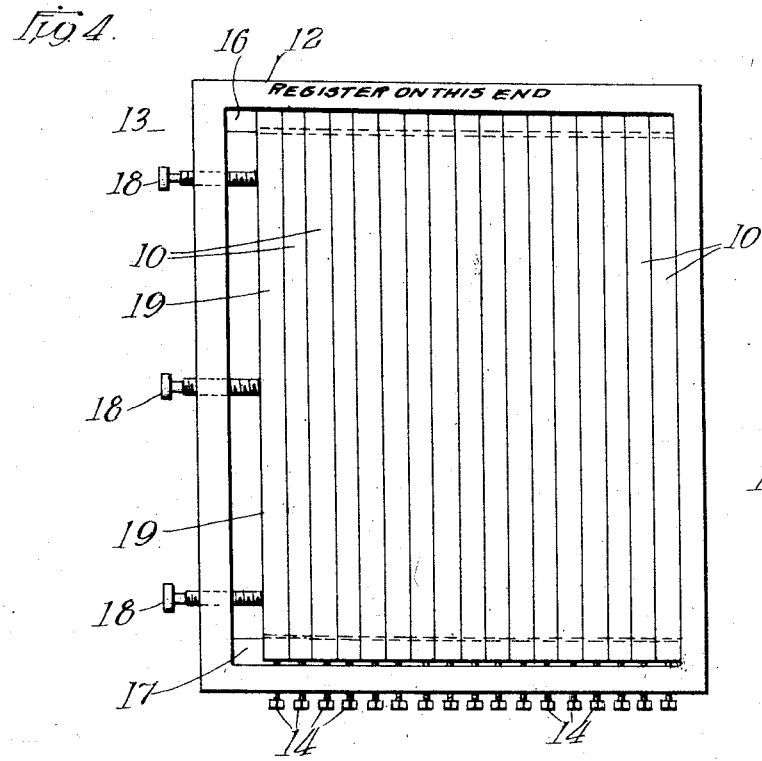
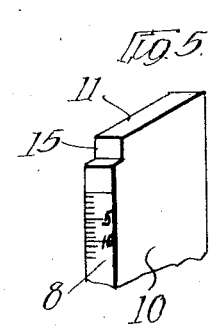
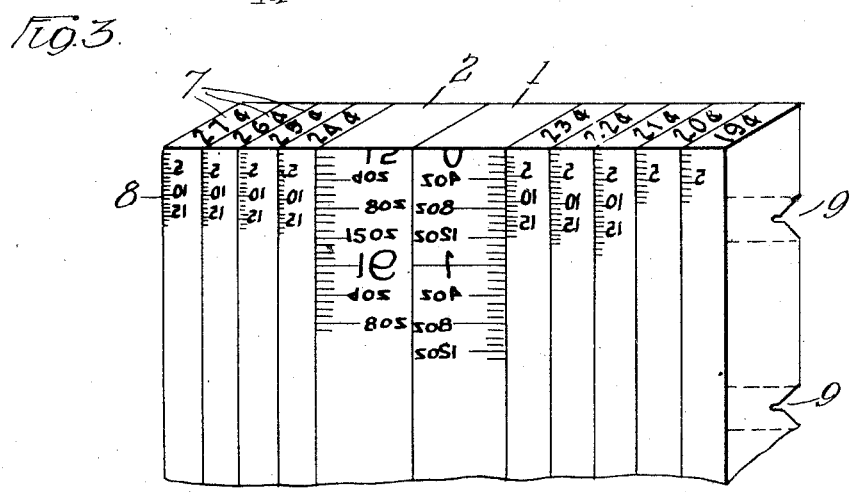
Witnesses:
Harry B. L. White
W. F. Kilroy
Inventor
Eugene I. Diener
By Brown Boettcher Diener
Attys.

Patented Oct. 12, 1926.

1,602,605

UNITED STATES PATENT OFFICE.

EUGENE I. DIENER, OF CHICAGO, ILLINOIS, ASSIGNOR TO TOLEDO SCALE COMPANY, OF TOLEDO, OHIO, A CORPORATION OF NEW JERSEY.

COMPUTING CHART.

Application filed September 27, 1923. Serial No. 665,045.

My invention relates to computing charts, and more particularly to charts for computing scales and the like. While the invention relates to such charts, it is more particularly concerned with the process of manufacture and the means for producing said charts than with the charts themselves.

In one form of computing scale with which I am familiar (namely, the Toledo Scale Company cylinder scale) and to which my invention is peculiarly applicable, there is employed a rotary cylinder bearing a chart and a stationary reference wire or index cooperating therewith. The chart is a two dimensional chart divided into vertical columns which are disposed circumferentially about the cylinder. The reference wire or index lies back of a glass window and is disposed parallel to the axis of the cylinder upon which the chart is mounted.

Each circumferential column corresponds to a given value per unit of weight, for example, cents per pound, and the graduations of each column are made in terms of cents or multiples of one cent. There is also a column graduated in terms of weight, so that the weight of the article or material may be directly indicated.

Now it will be apparent that the space which must be devoted to each column to make it clearly legible is considerable. In practice, the value columns are about ⅜ths of an inch wide and the weight column is about ¾ths of an inch wide. Hence, within practical dimensions the number of columns that can be provided is definitely limited. The present commercial machine to which I have referred has between thirty and forty value columns. However, this number of columns does not begin to exhaust the rates in cents per pound or cents and fractions of cents per pound at which goods or materials are commonly sold. For example, one merchant may sell his goods at even cents per pound, whereas, another merchant wishing to sell at slightly less price sells at a fraction of a cent less. Also, a grocer in a large city may sell at a range of from five to sixty cents per pound, whereas the grocer in the small town may sell from two to forty cents per pound.

In practice, the chart cannot carry all possible unitary and fractional rates or even any considerable part of them. And, as a result, an approximation must be resorted to by the merchant on such fractional rates as are not on his chart. There is constant demand for special charts because of fluctuating price levels, because of different selling conditions, and because particular prices are varied. As now constructed, these charts are printed from unitary lithograph stones. Hence, if even a single column is to be changed, it requires a new chart, and consequently a new lithograph stone must be engraved to make the chart.

The reason that the chart is printed from a lithograph stone is because of the requirement for extreme accuracy. The chart is an instrument of precision and it must be graduated as such. This fact will be appreciated to some degree when it is realized that there are as many as 900 graduations in a single column, as commercially employed on the Toledo cylinder scale, the chart of which is approximately 27 inches in circumferential length.

Now, not only must these 900 graduations register accurately with the corresponding weight column to give accurately the value in cents of the quantity on the scale, but these 900 graduations of one column must register with all the corresponding graduations of all the other columns. This registration must be so accurate that no error can be discerned by the eye.

The cost of engraving a lithographic stone for a new chart is very high (at present prices about $750.00) and the time involved is excessive. Early in the development of articles of this class attempts were made to print charts of this kind from movable individual type. This was found at once to be unsatisfactory because the slightest variation in the individual type rendered the chart worthless. Any error which might appear in the thickness of type would be multiplied many times, for example, 900 times in the above referred to column. Another reason appears why movable type is not successful, and that is, that the units of each column are different from the units of all other columns, hence the type would not be interchangeable.

The result has been that heretofore all charts of this character have been first engraved upon a monolith lithographic block and then printed upon paper or cardboard, or the like. Instead of lithographic stone a block of metal may be employed.

I have conceived that it is possible to construct the chart from interchangeable units, each of which can be properly graduated and assembled and made to register accurately with all others. This I do by having an individual bar suitably engraved for each desired value column, and a bar duly engraved for the weight values. These bars are all carefully assembled and locked in a form, and the chart may then be printed from said form. The form may be broken up and different combinations of columns readiy secured as desired, to print the desired chart. I provide ready means for securing accurate registration by having the ends of the bars all accurately planed off at zero or at a fixed distance from zero so that when these planed off faces are brought into the same plane. all the corresponding graduations of all of the columns are accurately in register. Obviously, any other well known scheme of providing a registering face or opening for each bar may be provided so that all of the bars may be brought into suitable alignment and hence into accurate registration.

The principles of my invention may be employed in constructing charts other than those having parallel columns only. For example, sector shaped charts may be made by breaking the chart up along the value columns which are arcuate in form. The printing bars may then be made interchangeable and capable of accurate registration.

In this way a great number of combinations for charts may be secured from a relatively small number of individual value bars, and the desired degree of accuracy may also be readiy attained. Thus, if a customer desires a special chart it can easily be printed from a combination of my movable and interchangeable value bars without entailing the expense and delay of engraving the desired chart upon a lithographic stone or block.

The value bars are preferably formed of metal, such for example, as zinc, steel, bronze or the like, or they may be engraved upon any other suitable material.

In order to acquaint those skilled in the art with the manner of constructing and operating my invention, I shall now describe the same in connection with the accompanying drawings in which:—

Fig. 3 shows in isometric view a plurality of value column bars constructed according to my invention and assembled in register; and Fig. 4 shows the bars assembled and locked in a suitable printing form.

Fig. 5 is an enlarged fragmentary perspective view of an end of one of the bars; and Fig. 6 is a fragmentary elevational view of the end of a bar with the end plate of a supporting frame or form shown in section.

Figure 1:
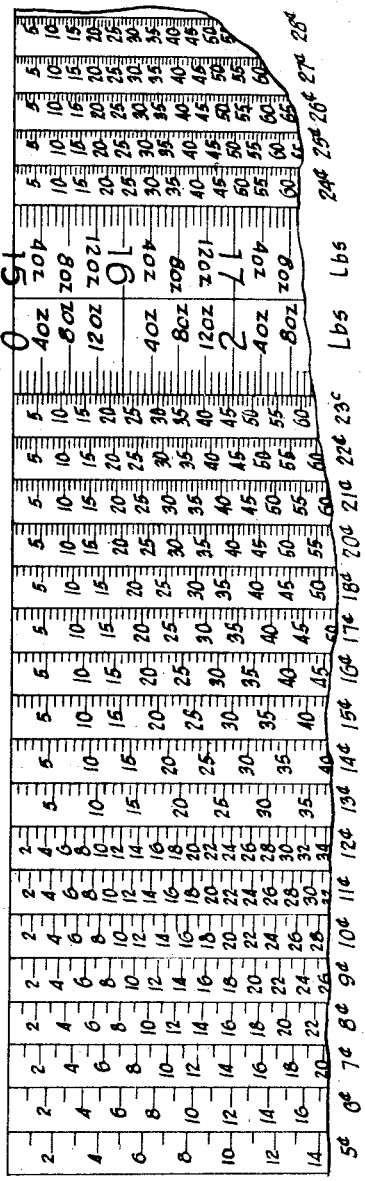
Fig. 1 is a fragmentary face view of a computing chart such as I construct according to my invention.
Figure 2:
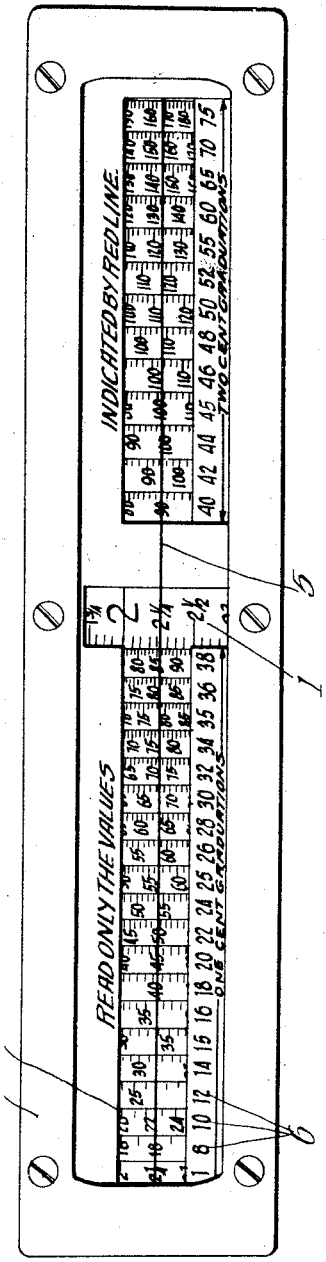
Fig. 2 is a face view of the computing mechanism of the well known form of computing scale employing a chart of the same character as that shown in Fig. 1, but having different value columns.

Now, referring to Fig. 1 where I have shown a portion of a typical chart employed on a computing scale, the central column 1 is graduated in accordance with the weight of the article to be weighed and computed. Column 2 immediately adjacent the same is a reverse column to be displayed upon the opposite side of the cylinder and to be viewed by the customer. The cylinder which bears the chart shown in Fig. 1 is enclosed in a housing having a glass window, as indicated in Fig. 2, mounted in a suitable frame 4 for displaying the weight column and the value column. A portion of the housing covers the reverse weight column 2.

In the chart shown in Fig. 1, the values in terms of cents per pound has been indicated below the respective columns, and the figures appearing in the columns are the product of the particular value of weight corresponding to the longitudinal distance along the scale and the rate which is constant for the given column.

Now it is to be observed that this chart must register accurately throughout its entire area, that is to say, not only must the graduations of a value column register accurately with the weight column, but they must register accurately with all other graduations of all other columns.

As shown in Fig. 2, a line parallel to the axis of the cylinder is provided by means of a wire lying back of the glass window 3 and closely adjacent the surface of the cylinder, this line or wire serving as an index or reference line from which the weight may be read, and by which also the value of the article when computed in accordance with different stated values per pound are considered. Upon the lower part of the frame 4 and in register with the respective columns there are shown the stationary figures 6 which are the values corresponding to the respective columns. Thus, the first column in Fig. 2 gives indications corresponding to the product of a given weight with the rate of one cent per pound. Thus. if the amount of material purchased is $2\frac{1}{4}$ pounds, as indicated from the column 1, namely, the weight column, and if this material were worth one cent per pound. the value of the quantity on the scale would be $2\frac{1}{4}¢$ as indicated in the first column under the index wire 5. However, if this material were ten times as valuable, then we would read the value from the third column at 10¢ per pound, and its value would be 22½¢. If the value were 20¢ per pound, we should read a value of 45¢, and so on. From this it can be seen that the chart must be so accurate that at no point can any error be detected, nor can a mistake be made which would cause the merchant to overcharge a customer by one cent, for such inaccuracy would condemn the scale. If, on the other hand, the inaccuracy should result in a loss of one cent to the merchant for the transaction, it is apparent that he would quickly lose his profit by giving away a part of his goods.

Now, bearing this extreme accuracy in mind, I have devised a way of printing these charts consistent with the accuracy requirement and which makes possible the printing of any desired chart by assembling the corresponding value columns.

I provide a plurality of suitable bars, preferably of metal, as indicated at 7 in Fig. 3, and on the faces of these bars, as indicated at 8, I form the graduation corresponding to the desired values.

I have shown these bars as cut off and accurately finished off as by grinding at the zero line. It will be understood that instead of cutting the bars off accurately at zero, they may be cut off an equal distance from zero so that when all of the end faces of the bars 7 are brought into the same plane and all of the faces of the bars brought into the same plane, the graduations will all be accurately in register. If desired, grooves or notches, as indicated at 9 may be formed in the rear of all of the bars at corresponding places, so that by introducing a wedge bar into these V-shape notches the bars may all be accurately aligned.

Preferably, I provide spaces at the ends of the bars for registering the same with the faces in the same plane, and with the graduations longitudinally in register, as indicated in Figs. 4, 5 and 6. The bars are all constructed at both ends as indicated in Fig. 5, each bar 10 having at its upper end, that is, adjacent the zero graduation, a face 11 for longitudinally aligning all of the bars.

These end faces 11 are abutted against an end plate 12 of a suitable form or frame 13. To insure that the faces accurately abut against the cross member 12, I have provided a series of thumb screws 14 for pressing these bars endwise into engagement with the registering cross bar 12.

Each bar 10 has at its ends faces 15 resting upon shelves 16 and 17 at opposite ends of the frame or form 13, so as to bring all of the faces 8 of the respective bars into the same plane. These bars are then locked in the form by the locking screws 18, a blank bar 19 being engaged by these screws to assist in holding the value column bars accurately in place. Suitable backing may then be placed over said registered bars and the chart may be printed in the usual manner.

The bars may, of course, be locked in place by the ordinary printer's quoins and they may, if desired, be made in two or more sections. Since the figures need not be placed with the accuracy necessary for the graduations, the figures may, if desired, be printed on the chart in a separate operation.

After the desired chart is printed the form may be unlocked and the bars released for making up a form for a different chart. Thus, by providing a suitable number and assortment of value column bars, any desired chart may quickly and conveniently be printed.

I am aware of the usual interchangeable type for printing words, figures and symbols, and I am aware of linotype slugs and similar means for printing words, symbols and figures, but my invention solves an entirely different problem by different means.

I do not intend to be limited to the precise details shown and described.

I claim:—

1. In a device of the class described, in combination, a plurality of bars adapted to be arranged side by side in various combinations, each of said bars bearing a series of graduations each representing the product of a constant and a variable, the variable being proportional to the distance of the graduation from a given point on the bar called a zero point and the constant corresponding to a price per unit of weight, and means for holding said bars together with their zero points in accurate alignment.

2. In a device of the class described, in combination, a plurality of bars, certain of said bars bearing graduations corresponding to weights and certain of said bars bearing graduations corresponding to the product of such weights by various prices per pound, and means for holding said bars securely in assembled relation with the graduations corresponding to a given weight and the graduations corresponding to the products of such weight by the various prices per pound in alignment.

3. In combination, a plurality of value column plates or bars all of the same length between zero and the terminal value, said plates each providing a linear scale graduated in terms of the product of a constant and a variable, which variable corresponds to the distance from zero point on the scale, and means for holding said plates with their graduations all in register.

In witness whereof, I hereunto subscribe my name this 22nd day of September, 1923.

EUGENE I. DIENER.